R. L. HEBERLING AND W. E. HOLLAND.
STORAGE BATTERY.
APPLICATION FILED JUNE 2, 1920.
1,373,241.
Patented Mar. 29, 1921.
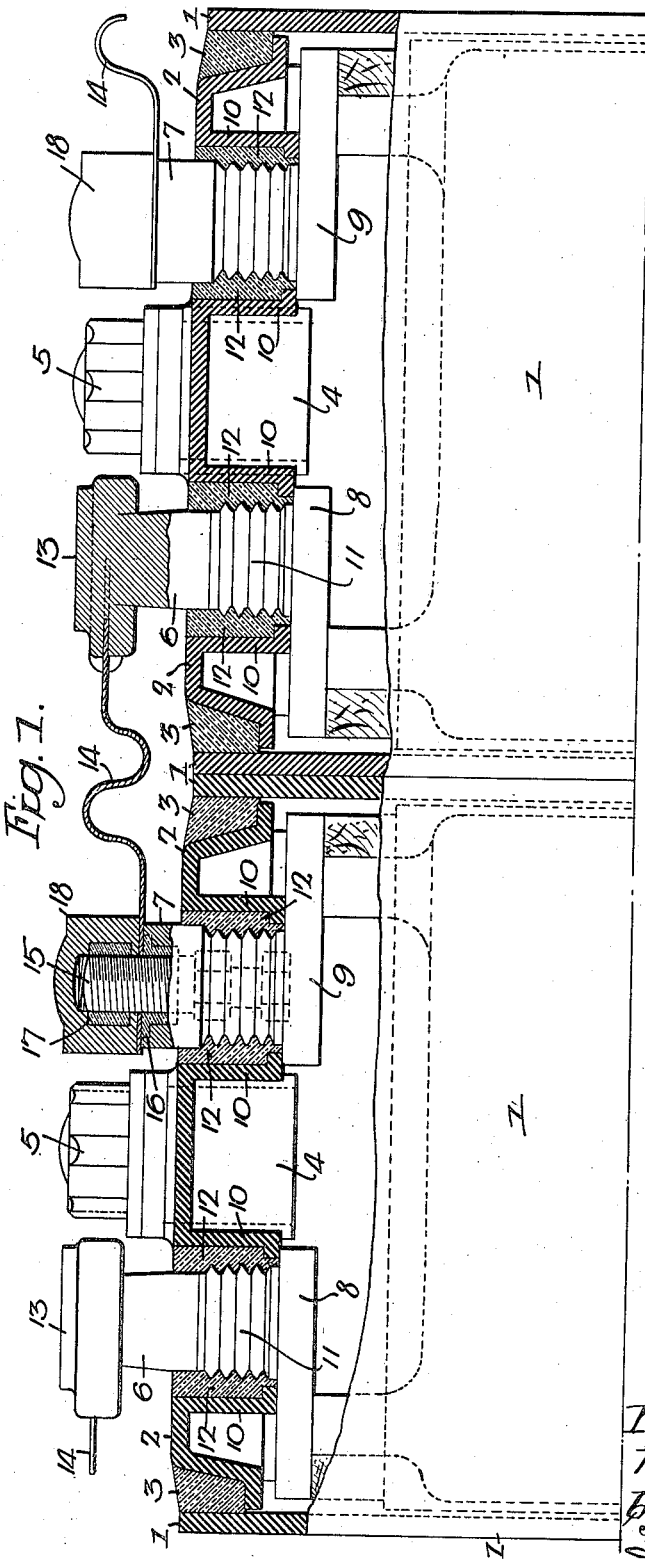
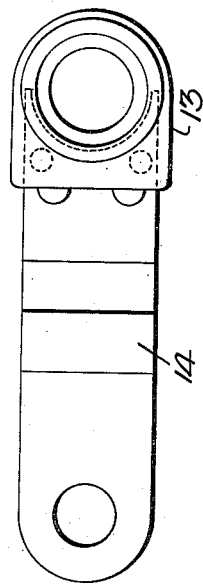
Inventors-
Russell L. Heberling,
Walter E. Holland
by their Attorneys-
Howson & Howson

UNITED STATES PATENT OFFICE.

RUSSELL L. HEBERLING AND WALTER E. HOLLAND, OF PHILADELPHIA, PENNSYLVANIA, ASSIGNORS TO PHILADELPHIA STORAGE BATTERY COMPANY, OF PHILADELPHIA, PENNSYLVANIA, A CORPORATION OF PENNSYLVANIA.

STORAGE BATTERY.

1,373,241.    Specification of Letters Patent.    Patented Mar. 29, 1921.

Application filed June 2, 1920. Serial No. 385,943.

*To all whom it may concern:*

Be it known that we, RUSSELL L. HEBERLING and WALTER E. HOLLAND, citizens of the United States, residing in Philadelphia, Pennsylvania, have invented Storage Batteries, of which the following is a specification.

This invention relates more particularly to those parts of a storage battery whereby the individual cells are electrically connected in the desired manner, and more especially has to do with improvements in the conductors and in the devices whereby these are electrically connected to the terminal posts of the said cells.

One object of the invention is to provide a novel construction and arrangement of the cell terminals and connectors, with a view to permitting any number of cells to be readily connected or disconnected, and that without possibility of connecting any cell or cells with the polarity reversed.

It is further desired to provide a novel form of electrical conductor or connector for making electrical connection between adjacent storage battery cells, which while being of relatively high conductivity, shall possess such flexibility as will permit of the limited relative movement of the cells or parts without danger of cracking or breaking of the sealing compound or straining the posts or other parts of the cells or battery.

The invention also contemplates novel means for preventing or materially reducing the corrosion and resultant poor electrical contact or even the total destruction of connecting parts occurring under certain conditions at certain of the terminals of a storage battery cell of all former types having bolted or other demountable form of post connection while allowing of the convenient connection and disconnection of the cells constituting a battery.

These objects and other advantageous ends we attain as hereinafter set forth, reference being had to the accompanying drawings, in which, Figure 1 is a side elevation, partly in section, of two of the cells of a storage battery, illustrating our invention as applied thereto; and Fig. 2 is a plan of one of the flexible conductors for connecting the terminal posts of adjacent cells.

In the above drawings, 1 represents the rubber or other insulating container of a storage battery cell which has a flanged cover 2, and a body of sealing compound 3 whereby a liquid- and gas-tight joint is formed between said container and the cover. The latter has a filling and vent tube 4, normally closed by a removable cap or plug 5, and there are two terminal posts 6 and 7 projecting above the cover which form an integral part of two straps 8 and 9 to which the terminal lugs of the two series of plates of the cell are respectively connected. The openings in the cover 2 for the terminal posts are provided with inwardly projecting, inwardly flanged sleeves 10 and the greater length of the posts 6 and 7 within these sleeves is corrugated or provided with annular ribs or petticoats 11; there being sealing compound 12 within the space between each post and its sleeve.

One of the two posts of each cell, in the present instance that indicated at 6, in accordance with our invention is formed of a solid leaden structure, having burned, welded or otherwise integrally connected to its upper end a leaden head 13, which is cast around, so as to make good electrical contact with, one end of a relatively thin flexible copper strip or other high conductivity metal 14, preferably lead-plated for better protection against acid. The end of said strip within this head is semi-circularly recessed, since the head 13, before being burned to the terminal post 6, preferably has the form of a ring and in the process of burning this ring is filled with a mass of melted lead or leaden material whereby it is integrally connected to said post. The cap or head 13 and therefore one end of the flexible strip conductor 14, are thus permanently connected to the post 6 which, also in accordance with our invention, is the positive terminal of the cell.

The second or negative terminal post 7 is cast or otherwise formed of lead or lead alloy, surrounding and making electrical contact with one end of a threaded stud 15, usually made of brass and having an undercut portion, forming shoulders, together with one or more flat sides within the body of said post, to prevent both longitudinal and rotary movement of the stud. The threaded end of this stud projects above the flat upper end of the post proper, which preferably is faced with a brass collar or ring 16 set flush therein. Coacting with the threaded end of the stud 15 is a clamping nut consisting of a brass or other relatively hard, metallic body 17 inclosed by a leaden covering 18, with a flat under face designed to clamp the perforated free end of the flexible copper strip 14 against the flat top of the terminal post 7.

In order to permit of the unavoidable limited relative movement of adjacent connected battery cells, the flexible strip 14 connecting the terminal 6 of one of said cells with the terminal 7 of another is preferably corrugated or folded on itself, so that owing to its relative thinness and flexibility, no strain is placed upon the terminal posts, sealing compound or other parts of the cells when these latter move relatively to each other. As before indicated, the terminal posts 7 with its nut 17—18 constitutes the negative terminal of each cell and provides the means whereby the flexible conductor, whose leaden head is burned integral with the positive terminal of another cell, may be demountably connected.

We have found by experience that but one terminal, namely, the positive, of a storage battery cell is subject to harmful corrosion or electrolytic action, due to its polarity, which in the presence of a film of electrolyte, causes a tendency to oxidize or dissolve the metals present, whereas the polarity of the negative terminal protects the metals of which it and its connected parts are constructed, since the tendency is for metals to reduce or plate out of solution at the negative. Accordingly we have constructed the positive post and the positive end of the connector, of non-corrodible lead alloy and have made an integral burned connection therebetween,—the demountable parts, which necessarily are made of relatively corrodible metals, being used at the negative terminal only. There is therefore no possibility of deterioration of the contact between the post 6 and its associated end of the connector 14. On the other hand, the demountable or separable connection between the second end of the connector 14 and the negative terminal post 7 of another cell, is not subject to corrosion or deterioration from the cause indicated above, and one of the important advantages of the invention resides in the fact that a good electrical connection between cells is assured, this connection being dependable and permitting the convenient disconnection and reconnection of the cells.

By employing thin strip copper as the material for the cell connectors 14, these may be made relatively flexible, especially if corrugated as shown, so that the limited relative movement of the cells cannot cause objectionable or injurious stresses to be brought upon the terminal posts, sealing compound, or other parts. Another important advantage of the construction above described is that all of the positive terminal posts of a number of cells are easily and unmistakably identified by their plain tops and solid leaden construction, while the negative terminal posts are identified by their projecting threaded studs and coacting clamping nuts which permit of the demountable attachment of the perforated free ends of the flexible strip connectors. It is therefore to be noted that when a number of cells are to be assembled to make up a battery, there is no possibility of connecting together two positive or two negative terminal posts, since in accordance with our invention the design of the connectors permits of their being mounted to connect cells only when said cells are so placed that the leaden head end of each connector connects with a positive post and the free end falls on a negative post of the demountable design above described.

The terms "positive terminal" and "negative terminal" are used herein to denote the conductors formed as posts or the like, which, in the lead-acid type of storage battery cell, connect with the lead peroxid and the metallic lead plates respectively.

On referring to certain parts of the battery and its associated structures as "lead" or "leaden," it is to be understood that these terms are intended to include and cover not only the metal lead itself but such equivalent materials such as alloys of antimony or other metals, with lead.

We claim:—

1. The combination of a plurality of storage battery cells each having positive and negative terminal posts; with at least one intercell conductor in permanent electrical and mechanical connection with a positive terminal post, the negative terminal posts being formed to detachably engage such conductor.

2. The combination of a plurality of storage battery cells each having positive and negative terminal posts; with a flexible conductor of metal of relatively high conductivity integrally connected to the positive terminal post of each cell with and formed for detachable engagement with the negative terminal post of an adjacent cell.

3. A storage battery cell having positive and negative terminal posts of unlike form; the positive terminal post being of a material and form permitting of its being integrally joined, to make a non-corrosive union, with one end of a suitable connector; and the negative terminal post being formed to detachably engage the opposite end of a similar connector.

4. A storage battery cell having positive and negative terminal posts of unlike form; the positive terminal post being of leaden material and formed to permit of its being integrally joined with a leaden head on a connecting conductor; the negative terminal post being formed to detachably engage the opposite end of a similar connecting conductor.

5. A storage battery cell having positive and negative terminal posts; a cell-connecting conductor integrally connected with the positive terminal post; and means for detachably connecting the conductor of another cell to the negative terminal post.

6. A storage battery cell having positive and negative terminal posts; a relatively flexible cell-connecting conductor; a head of leaden material formed about one end of said conductor and integrally connected to the positive terminal post of the cell; with means for detachably connecting another cell connector to the negative terminal post.

7. A storage battery cell having positive and negative terminal posts; a relatively flexible cell-connecting conductor; a leaden head formed about one end of said conductor and integrally connected to the positive terminal post of the cell; with means for detachably connecting another cell connector to the negative terminal post, the same consisting of a threaded stud forming part of the negative terminal post and a clamping nut on said stud.

8. The combination in a storage battery cell of positive and negative terminal posts, the positive terminal post consisting of a body of leaden material, a head of leaden material burned to said post, and a relatively flexible, high-conductivity connector permanently joined with said head; with means for detachably connecting a second connector to the negative terminal post.

9. The combination in a storage battery cell of positive and negative terminal posts, the positive terminal post consisting of a body of leaden material, a head of leaden material burned to said post and a relatively flexible high-conductivity connector permanently joined with said head; with means for detachably connecting a second connector to the negative terminal post, said negative terminal post consisting of a threaded stud of relatively hard metal and a body of leaden material cast around the same, and a nut for said stud consisting of a threaded member having a covering of lead.

10. The combination in a storage battery cell of positive and negative terminal posts, of which the latter post is formed for the demountable attachment of a connector and includes relatively corrodible metal of relatively high conductivity; the positive post being formed of relatively non-corrodible metal; with a cell-connecting conductor integrally connected to said positive post.

11. The combination in a storage battery cell of positive and negative terminal posts, of which the latter post is formed for the demountable attachment of a connector and includes relatively corrodible high-conductivity metal; the positive post being formed of relatively non-corrodible metal; with a cell connecting conductor having a head of relatively non-corrodible metal surrounding one of its ends and burned to the positive post.

12. A storage battery cell connector having ends of unlike form; of which one has a head of relatively non-corrodible material for integral connection to a positive terminal post; and the other end is formed for detachable engagement with a negative terminal post.

13. A storage battery cell connector consisting of a thin, relatively flexible strip of a metal of high conductivity having at one end an integrally connected head of relatively soft non-corrodible metal formed for integral attachment to a battery terminal post.

14. A storage battery cell connector consisting of a relatively thin corrugated strip of copper having an opening at one end; with a leaden head integrally connected to its other end and formed for integral attachment to a battery terminal post.

RUSSELL L. HEBERLING.
WALTER E. HOLLAND.